United States Patent [19]

Blum et al.

[11] Patent Number: 5,710,209
[45] Date of Patent: Jan. 20, 1998

[54] AQUEOUS BINDERS FOR COATING COMPOSITIONS BASED ON POLYESTER POLYURETHANES

[75] Inventors: Harald Blum, Wachtendonk; Josef Pedain, Köln, both of Germany

[73] Assignee: Bayer Aktiengesellschaft, Leverkusen, Germany

[21] Appl. No.: 602,539

[22] Filed: Feb. 20, 1996

[30] Foreign Application Priority Data

Feb. 27, 1995 [DE] Germany .................. 195 06 736.3

[51] Int. Cl.$^6$ .................. C08J 3/00; C08K 3/20; C08L 75/00
[52] U.S. Cl. .................. 524/594; 524/538; 524/839; 524/840
[58] Field of Search .................. 524/539, 591, 524/839, 840

[56] References Cited

U.S. PATENT DOCUMENTS

| | | | |
|---|---|---|---|
| 3,412,054 | 11/1968 | Milligan et al. | 260/18 |
| 3,454,505 | 7/1969 | Cross et al. | 260/2.5 |
| 5,004,779 | 4/1991 | Blum et al. | 524/591 |
| 5,047,294 | 9/1991 | Schwab et al. | 428/432.1 |
| 5,126,393 | 6/1992 | Blum et al. | 524/538 |
| 5,326,596 | 7/1994 | Kasari et al. | 427/379 |
| 5,387,642 | 2/1995 | Blum et al. | 524/591 |

FOREIGN PATENT DOCUMENTS

| | | |
|---|---|---|
| 2033530 | 7/1991 | Canada . |
| 140323 | 5/1985 | European Pat. Off. . |
| 157291 | 10/1985 | European Pat. Off. . |

*Primary Examiner*—Patrick Niland
*Attorney, Agent, or Firm*—Joseph C. Gil; Thomas W. Roy

[57] ABSTRACT

An aqueous dispersion of a polyester polyurethane which contains as essential building component 1-methyl-2,4- and/or -2,6-diisocyanatocyclohexane and its use as the binder for one- or two-component coating compositions, optionally in combination with cross-linking agent resins selected from optionally blocked polyisocyanates and/or aminoplast resins.

5 Claims, No Drawings

AQUEOUS BINDERS FOR COATING COMPOSITIONS BASED ON POLYESTER POLYURETHANES

BACKGROUND OF THE INVENTION

1. Field of the Invention

The present invention relates to new dispersions of polyester polyurethanes having hydroxyl groups, which contain as essential building blocks 1-methyl-2,4- and/or -2,6-diisocyanatocyclohexane incorporated via urethane groups, and aqueous coating compositions containing these dispersions, optionally in combination with known cross-linking agent resins.

2. Description of the Prior Art

Aqueous binders based on hydrophilically modified polyester polyurethanes are known, e.g. from EP-A-0,355,682, EP-A-0,379,007, EP-A-0,427,028, EP-A 0,436,941, EP-A-0,496,205 or U.S. Pat. No. 3,412,054.

The aqueous dispersions or resin solutions described in these prior publications generally result in lacquers and coatings with a superior level of properties, which can be used for various applications, such as stoving fillers, stoving finishes, oxidatively drying finishes or aqueous two-component polyurethane coating compositions.

It has now surprisingly been found that aqueous dispersions of polyester polyurethanes having hydroxyl groups, which contain as essential building components 1-methyl-2,4- and/or -2,6-diisocyanato-cyclohexane incorporated via urethane groups and optionally urea groups may be used to produce compositions which, in addition to superior properties, also possess particularly good viscosity stability during storage and processing when compared to the known compositions.

Improved viscosity stability is required in many fields of application for aqueous lacquer binders. For example, in the case of aqueous two-component polyurethane coating compositions, it is required that the viscosity of the reaction mixture should be stable for as long as possible after mixing the two reactants, since a rapid viscosity increase considerably shortens the processing time. Also, in the case of systems to be processed as one-component systems, e.g., those that are capable of air drying due to the presence of olefinically unsaturated hydrocarbon groups or those that contain blocked polyisocyanates or melamine resins as hardeners, an improved viscosity stability is desirable in order that the aqueous binders and lacquers have their initial viscosity unchanged even after relatively long storage and can be applied directly without additional measures.

SUMMARY OF THE INVENTION

The present invention relates to aqueous dispersions having a viscosity at 23° C. of 10 to 20,000 mPa.s and a pH of 5.5 to 10 and containing 20 to 60 wt. %, based on solids, of a polyester polyurethane which has a weight average molecular weight of 1500 to 100,000, a hydroxyl number of 20 to 300 mg KOH/g, a carboxyl group content corresponding to an acid number of 7 to 70 mg KOH/g (in which 20 to 100% are present in neutralized form as carboxylate groups), and a content of urethane groups (calculated as —NH—CO—O—, molecular weight 59) of 2.5 to 15 wt. %, and is the reaction product of a) 50 to 91 wt. % of a polyester component containing one or more polyester polyols having a hydroxyl number of 25 to 350, b) 7 to 45 wt. % of a polyisocyanate component containing at least 50 wt. %, based on the weight of component b), of 1-methyl-2,4- and/or -2,6-diisocyanatocyclohexane, the remainder selected from organic polyisocyanates having a molecular weight of 140 to 1500, c) 2 to 12 wt. % of a component containing one or more compounds having at least one isocyanate-reactive group and at least one anionic or potential anionic group, d) 0 to 10 wt. % of a component containing one or more compounds having one or two isocyanate-reactive groups and containing at least one non-ionic, hydrophilic polyether chain and e) 0 to 30 wt. % of a component, which is different from components a), c) and d), contains isocyanate-reactive groups and has a molecular weight of 62 to 2500, wherein the sum of the percentages of a) to e) add up to 100.

The present invention also relates to one- or two-component coating compositions containing these aqueous dispersions and optionally cross-linking agents.

DETAILED DESCRIPTION OF THE INVENTION

Preferred aqueous dispersions according to the invention for use in one-component compositions contain polyester polyurethanes which have an iodine number of 20 to 95 and are the reaction product of a) 68 to 88 wt. % of a polyester polyol which is the reaction product of a1) 25 to 65 wt. % of a monocarboxylic acid component containing at least 75 wt. % of one or more fatty acids capable of oxidative drying, a2) 10 to 45 wt. % of a polycarboxylic acid component containing one or more di-, tri- and/or tetracarboxylic acids having a molecular weight of 98 to 840 and/or their corresponding anhydrides and a3) 12 to 40 wt. % of a polyol component containing one or more di- to tetrahydric alcohols having a molecular weight of 62 to 200, b) 8 to 23 wt. % of a polyisocyanate component containing at least 75 wt. %, based on the weight of component b), of 1-methyl-2,4- and/or -2,6-diisocyanatocyclohexane, the remainder selected from organic polyisocyanates having a molecular weight of 168 to 318, c) 4 to 8 wt. % of dimethylolpropionic acid and e) 0 to 10 wt. % of a component, which is different from components a) and c), contains hydroxyl and/or amino groups and has a molecular weight of 62 to 1200, wherein the sum of the percentages of a1) to a3) and a) to e) add up to 100.

The aqueous polyester polyurethane dispersions according to the invention preferably have a solids content of 30 to 53 wt. %, based on solids. The solids content of the dispersions according to the invention is based on (i) the polyester urethane (ii) water and optional solvent, without taking into account lacquer additives optionally present in the dispersions. The aqueous polyester polyurethane dispersions have a viscosity at 23° C. of 30 to 5000 mPa.s and a pH of 6 to 9. The pH of the dispersions according to the invention is determined after dilution with water to a solids content of 10%.

The polyester polyurethanes present in the dispersions according to the invention have a weight average molecular weight ($M_w$, determined by gel permeation chromatography using polystyrene as the standard) of 1500 to 100,000, preferably 2000 to 45,000; a hydroxyl number of 20 to 300, preferably 25 to 160, mg KOH/g of solids; a content of at least partly neutralized acid groups (especially carboxyl groups present at least partly in the form of carboxylate groups) corresponding to an acid number of 7 to 70, preferably 10 to 45 mg KOH/g of solids; a degree of neutralization of 20 to 100, preferably 50 to 100%; and a urethane group content (calculated as —NH—CO—O—, molecular weight 59) of 2.5 to 15, preferably 5 to 12.5 wt. %.

The special polyester polyurethanes according to the invention, which are suitable for the manufacture of air-drying, one-component coating compositions are prepared from olefinically unsaturated fatty acids and, thus, contain at least partly conjugated double bonds in an amount that corresponds to an iodine number of 20 to 95, preferably 30 to 65.

The polyester polyurethanes present as aqueous dispersions are reaction products, existing at least partly in salt form, of a) 50 to 91, preferably 65 to 90 and more preferably 68 to 88 wt. % of a polyester component, b) 7 to 45, preferably 7 to 30 and more preferably 8 to 23 wt. % of a polyisocyanate component and c) 2 to 12, preferably 3 to 9 and more preferably 4 to 8 wt. % of a component for incorporating anionic or potential anionic groups, d) 0 to 10, preferably 0 to 4 wt. % of a component for incorporating non-ionic hydrophilic groups and e) 0 to 30, preferably 0 to 10 and more preferably 0 to 7.5 wt. % of a component which is different from components a), c) and d), contains isocyanate-reactive groups and has a molecular weight of 62 to 2500, preferably 62 to 1200.

Polyester component a) is selected from polyester polyols having a hydroxyl number of 25 to 350, preferably 25 to 270, and an acid number of not more than 8, preferably not more than 4. All hydroxyl numbers and acid numbers are provided in mg KOH/g).

Polyester a) is manufactured by the polycondensation a1) 0 to 70 wt. % of a monocarboxylic acid component containing one or more monocarboxylic acids, a2) 5 to 60 wt. % of a polycarboxylic acid component containing one or more di-, tri- and/or tetracarboxylic acids and/or their corresponding anhydrides, a3) 10 to 70 wt. % of a polyol component containing one or more at least dihydric, more preferably di-, tri- or tetrahydric alcohol and a4) 0 to 30 wt. % of other components, wherein the sum of the percentages add up to 100.

The reaction for producing the polyester polyols can optionally be carried out with the aid of conventional esterification catalysts, preferably by melt condensation or azeotropic condensation at a temperature of 140° to 240° C.

Starting component a1) is selected from monocarboxylic acids having a molecular weight of 112 to 340. Examples include benzoic acid, tert-butylbenzoic acid, hexahydrobenzoic acid, saturated fatty acids (such as 2-ethyl-hexanoic acid, isononanoic acid, coconut oil fatty acid, hydrogenated technical fatty acids or fatty acid mixtures, decanoic acid, dodecanoic acid, tetradecanoic acid, stearic acid, palmitic acid and docosanoic acid), unsaturated fatty acids (such as soya oil fatty acid, castor oil fatty acid, sorbic acid, peanut oil fatty acid, conjugated diene fatty acid, tall oil fatty acid, sunflower fatty acid and safflower oil fatty acid) and mixtures of these and other monocarboxylic acids.

Starting component a2) is selected from di-, tri- and/or tetracarboxylic acids having a molecular weight of 98 to 840 or their anhydrides. Examples include phthalic acid, phthalic anhydride, isophthalic acid, terephthalic acid, tetrahydrophthalic acid, tetrahydrophthalic anhydride, hexahydrophthalic acid, hexahydrophthalic anhydride, maleic acid, maleic anhydride, succinic acid, succinic anhydride, fumaric acid, adipic acid, sebacic acid, azelaic acid, dimer fatty acid, trimer fatty acid, trimellitic acid, trimellitic anhydride, butane tetracarboxylic acid and mixtures of these and other acids or anhydrides.

Starting component a3) is selected from diols, triols, tetraols or higher functionality alcohols having a molecular weight of 62 to 1200, preferably 62 to 200. Examples include ethylene glycol, 1,2- and 1,3-propylene glycol, 1,3-, 1,4- and 2,3-butanediol, 1,6-hexane-diol, trimethylhexanediol, diethylene glycol, tri-ethylene glycol, hydrogenated bisphenols, 1,4-cyclohexanediol, 1,4-cyclohexane-di-methanol, neopentyl glycol, tricyclodecanediol, 1,4-butanediol, trimethylolpropane, glycerol, pentaerythritol, trimethylpentanediol, dipentaerythritol, ditrimethylol-propane, castor oil and mixtures of these and other polyhydric alcohols.

Optional starting component a4) is selected from lactones (such as in particular ε-caprolactone) and compounds having a molecular weight of 60 to 266 and containing at least one amino, hydroxyl and/or carboxyl group reactive with hydroxyl or carboxyl groups during the condensation reaction. Examples include monoalcohols such as n-hexanol; cyclo-hexanol; decanol; 2-ethylhexanol; dodecanol; octadecanol; natural fatty alcohol mixtures such as Ocenol 110/130 (available from Henkel); hydroxycarboxylic acids such as dimethylolpropionic acid, lactic acid and malic acid; aminoalcohols such as aminoethanol and diethanol-amine; aminoacids such as aminoacetic acid and aminohexanoic acid; amines such as ethylenediamine and diethylenetriamine; and mixtures thereof.

According to a particularly preferred embodiment, the polyester polyols a) are reaction products of a1) 20 to 65 wt. % of monocarboxylic acids, of which at least 75 wt. %, based on the weight of component a1), are selected from one or more fatty acids capable of oxidative drying, a2) 10 to 45 wt. % of di-, tri- and/or tetracarboxylic acids or their anhydrides and a3) 12 to 40 wt. % of di-, tri-, and/or tetrafunctional alcohols.

These special polyester polyols may be used to produce polyester polyurethanes that have air-drying properties.

According to a further preferred embodiment of the present invention, polyester polyols a) are reaction products of a1) 0 to 24 wt. % of one or more monocarboxylic acids, wherein at least 50%, based on the weight of component a1), are aromatic or saturated (cyclo)aliphatic monocarboxylic acids having 6 to 22 carbon atoms and the remainder are unsaturated aliphatic monocarboxylic acids.

a2) 15 to 60 wt. % of one or more di-, tri- and/or tetracarboxylic acids having a molecular weight of 98 to 840 or their anhydrides and a3) 22 to 63 wt. % of one or more di-, tri- and/or tetrafunctional alcohols having a molecular weight of 62 to 200.

Component b) is selected from organic polyisocyanates having a molecular weight of 140 to 1500, preferably 168 to 318, provided that at least 50, preferably at least 75 and more preferably 100 wt. % of component b) is 1-methyl-2,4- diisocyanato-cyclohexane and/or 1-methyl-2,6-diisocyanatocyclohexane. Preferably this diisocyanate or diisocyanate mixture is selected from 1-methyl-2,4-diisocyanato-cyclohexane or mixtures thereof with up to 35 wt. %, based on the weight of the mixture, of 1-methyl-2, 6-diisocyanatocyclohexane. These diisocyanates are known and can be manufactured by the gas-phase phosgenation described in German Patent Application P 44 12 327.2.

In addition to these essential diisocyanates, component b) can also contain other polyisocyanates such as 1,6-hexamethylene diisocyanate (HDI), 1-isocyanato-3,3,5-trimethyl-5-isocyanatomethyl-cyclohexane (IPDI), 2,4- and/or 2,6-diisocyanato-toluene (TDI), 4,4'-diisocyanatodicyclohexylmethane ($H_{12}MDI$) and 4,4'-diisocya-natodiphenyl-methane (MDI). Polyisocyanate component b) can also contain the known lacquer polyisocyanates prepared, e.g., from HDI, IPDI and/or TDI, although this is less preferred.

Component c) is selected from one or more compounds containing at least one isocyanate-reactive group and having at least one anionic and/or potential ionic group. These compounds preferably are carboxylic acids having at least one, preferably one or two, hydroxyl or amino groups or their corresponding salts. Suitable acids include 2,2-bis-(hydroxymethyl)-alkanecarboxylic acids (such as dimethylolacetic acid, 2,2-dimethylolpropionic acid, 2,2-dimethylolbutyfic acid and 2,2-dimethylolpentanoic acid), dihydroxysuccinic acid, hydroxypivalic acid and mixtures thereof. Dimethylolpropionic acid and/or hydroxypivalic acid are preferably used as component c).

Also suitable, although less preferred, as component c) are sulphonate diols, optionally having ether groups, such as those described in U.S. Pat. No. 4,108,814. If compounds c) containing free acid groups are used, then potential anionic groups are incorporated. To the contrary if compounds c) containing neutralized acid groups are used, then anionic groups are incorporated.

Optional component d) is selected from compounds containing non-ionic hydrophilic groups and having one or two isocyanate-reactive groups, preferably hydroxyl or amino groups. At least 80 wt. %, preferably 100 wt. % of the polyether chains of these compounds are ethylene oxide units, with the remainder selected from other alkylene oxides such as propylene oxide. Suitable compounds containing non-ionic hydrophilic groups polyethylene glycols having molecular weights of 300 to 3400 (such as Carbowax 300, 400, 1000, 1500, 2000, 3400 from Union Carbide), monofunctional polyethylene glycol monoalkyl ethers with molecular weights of 350 to 5000 (such as Breox 350, 550 and 750 from BP Chemicals and Polyethers LB 25, LB 30 and LB 40 from Bayer AG), difunctional polyetheramines (such as Jeffamine ED 600, ED 900 and ED 4000 from Huntsman) and monofunctional polyetheramines (such as Jeffamine M 715, M 1000 and M 2070 from Huntsman).

Optional component e) is selected from other mono-, di- and/or trifunctional compounds having a molecular weight 62 to 2500, preferably 62 to 1200, and containing hydroxyl and/or amino groups such as ethylene glycol, propylene glycol, trimethylolpropane, ethanolamine, diethanolamine, diethylenetriamine, cyclo-hexanol, dodecanol and monofunctional, unsaturated alcohols (such as Ocenol alcohols from Henkel). Higher molecular weight polyols that do not fall within groups a), c) or d), such as the known polycarbonate diols, may also be used a component e).

The polyester polyurethanes are manufactured either solvent-free or as a 40 to 99 wt. % organic solution. Components a), c), d) and e) are introduced into a reactor, optionally in the solvent, and reacted at temperatures of 40° to 140 ° C. with component b) until unreacted NCO groups are practically no longer detectable. In general, the relative proportions are selected such that the equivalent ratio of isocyanate groups to isocyanate-reactive groups is 0.2:1 to 0.9:1; the free acid groups of component c) are not included in the calculation of this equivalent ratio.

The reaction preferably occurs in presence of 0.01 to 2.5 wt. %, based on the weight of the reaction mixture, of suitable catalysts. If compounds that are not neutralized are used as component c), the at least partial neutralization of the potential ionic groups may take place during the reaction or before, during and/or after dispersion of the polyester urethane in water by the addition of a base. The degree of neutralization is 20 to 100, preferably 50 to 100% of the incorporated acid groups, in particular carboxyl groups. Any solvent optionally used can be removed before, during or after the dispersion or dissolution step, if desired, completely or partly by distillation, optionally azeotropically and/or in vacuum, and/or accompanied by the use of an inert gas stream.

Suitable solvents include N-methylpyrrolidone, diethylene glycol dimethyl ether, methyl ethyl ketone, methyl isobutyl ketone, acetone, toluene, xylene, butyl acetate, methoxypropyl acetate and mixtures of these or other solvents that are not reactive with isocyanate groups.

Suitable catalysts for the urethanization reaction include tertiary amines such as triethylamine; tin compounds such as tin(II) octanoate, dibutyltin oxide and dibutyltin dilaurate; and other known catalysts.

Suitable bases for neutralization include ammonia, N-methyl-morpholine, dimethylisopropanolamine, triethylamine, dimethyl-ethanolamine, methyldiethanolamine, triethanolamine, morpholine, tripropylamine, ethanolamine, triisopropanol-amine, 2-diethylamino-2-methyl-1-propanol and mixtures of these and other neutralizing agents. Also suitable, but less preferred as neutralizing agents, are sodium hydroxide, lithium hydroxide and potassium hydroxide. Preferred neutralizing agents are ammonia and dimethylethanolamine.

After the urethanization reaction, to obtain particular properties, small amounts of other organic solvents, such as ethanol, propanol, butanol, butylglycol, hexanol, octanol, butyldiglycol, ethyldiglycol, methyldiglycol and methoxypropanol, may be added. As alternatives in the dispersion step, the water/neutralizing agent mixture may be added to the resin; water may be added to the resin/neutralizing agent mixture; or the resin may be added to the water/neutralizing agent mixture; or the resin/neutralizing agent mixture may be added to water. The dispersibility of the resins in water can be improved, if desired, by use of external emulsifiers, such as ethoxylated nonylphenol. The dispersion step is generally carried out at 40° to 120° C.

In the two-component binder compositions according to the invention, the aqueous polyester polyurethane dispersions are used in combination with cross-linking agent resins B). Suitable resins B) include B1) hydrophobic polyisocyanates having a viscosity at 23° C. of 25 to 5000 mPa.s and an NCO content of 5 to 26 wt. %, B2) hydrophilic polyisocyanates containing chemically incorporated non-ionic, hydrophilic polyether chains and having an NCO content of 4 to 24 wt. %, B3) mixtures of polyisocyanates B1) and B2), B4) blocked polyisocyanates corresponding to polyisocyanates B1) to B3) in which the isocyanate groups are blocked with reversible, monofunctional blocking agents for isocyanate groups, B5) amino cross-linking agent resins and B6) mixtures of cross-linking agents B4) and B5), provided that when optionally blocked polyisocyanates are used as the sole cross-linking agents, the equivalent ratio of the optionally blocked isocyanate groups of component B) to the hydroxyl groups of component A) is 0.5:1 to 5:1.

Hydrophobic polyisocyanates B1) are selected from organic polyisocyanates that have an NCO content of 5 to 26%, contain aliphatically, cycloaliphatically, araliphatically and/or aromatically bound isocyanate groups and are liquid at room temperature. The polyisocyanate component B1) has a viscosity of 50 to 5000 mPa.s at 23° C. Preferred polyisocyanates are those having exclusively aliphatically and/or cycloaliphatically bound isocyanate groups, an (average) NCO functionality of 1.8 to 5.0 and a viscosity at 23° C. of 50 to 3000 mPa.s.

If required, these polyisocyanates can be blended with small amounts of inert solvents to obtain a viscosity within the disclosed ranges. The amount of solvent is calculated such that in the resulting coating compositions no more than 20 wt. % solvent, based on the weight of the binder, is present. Suitable solvents include aromatic hydrocarbons such as solvent naphtha and also those previously set forth.

"Lacquer polyisocyanates" prepared from hexamethylene diisocyanate, 1-isocyanato-3,3,5-trimethyl-5-isocyanatomethylcyclohexane (IPDI) and/or bis-(isocyanatocyclohexyl)methane, especially those prepared exclusively from hexamethylene diisocyanate, are very suitable. Lacquer polyisocyanates means the known derivatives prepared from these diisocyanates and containing biuret, urethane, uretdione, allophanate and/or isocyanurate groups, from which excess starting diisocyanate has been removed in known manner, preferably by distillation, to a residual content of less than 0.5 wt. %.

The preferred aliphatic polyisocyanates to be used according to the invention include polyisocyanates based on hexamethylene diisocyanate and having biuret groups, such as those described in U.S. Pat. Nos. 3,124,605, 3,358,010, 3,903,126, 3,903,127 and 3,976,622, which contain mixtures of N,N',N"-tris(6-isocyanato-hexyl)biuret with minor amounts of its higher homologs, and polyisocyanates containing isocyanurate groups (cyclic trimers) based on hexamethylene diisocyanate, such as those described in U.S. Pat. No. 4,324,879, which contain N,N',N"-tris(6-isocyanatohexyl) isocyanurate mixed with minor amounts of its higher homologues.

Especially preferred are mixtures of polyisocyanates based on hexa-methylene diisocyanate and having uretdione, allophanate and isocyanurate groups, such as those obtained by catalytic oligomerization of hexamethylene diisocyanate with the use of trialkylphosphines. Particularly preferred are such polyisocyanate mixtures having a viscosity at 23° C. of 50 to 500 mPa.s and an NCO functionality of 2.2 to 5.0.

The aromatic polyisocyanates which also are suitable according to the invention, but less preferred, include in particular lacquer polyisocyanates based on 2,4-diisocyanatotoluene or mixtures thereof with 2,6-diisocyanatotoluene or based on 4,4'-diisocyanatodiphenylmethane or mixtures thereof with its isomers and/or higher homologs. These aromatic lacquer polyisocyanates include polyisocyanates having urethane groups and obtained by the reaction of excess quantities of 2,4-diisocyanatotoluene with polyhydric alcohols such as trimethylolpropane followed by removal of the unreacted excess diisocyanate by distillation. Other suitable aromatic lacquer polyisocyanates include the trimers of the previously disclosed monomeric diisocyanates, i.e., the corresponding isocyanato-isocyanurates from which excess monomeric diisocyanates have been removed, preferably by distillation.

The use of these unmodified polyisocyanates is possible, provided that they conform to the viscosity requirements. Polyisocyanate component B1) may also contain mixtures of the previously disclosed polyisocyanates.

Polyisocyanate component B2) is selected from hydrophilically modified polyisocyanates, such as the previously described lacquer polyisocyanates, in particular the HDI-based lacquer polyisocyanates having isocyanurate groups, that have been hydrophilically modified with a sub equivalent amounts of monohydric hydrophilic polyether alcohols. These hydrophilically-modified polyisocyanates preferably have an NCO content of 4 to 24 wt. % and a ethylene oxide content of 4 to 30 wt. % present within polyether chains having 6 to 60 units. The manufacture of these polyisocyanates, in which the hydrophilic polyether chains primarily contain ethylene oxide units, is described, for example, in U.S. Pat. No. 4,663,337 or in EP-A-540,985.

Cross-linking component B3) is selected from mixtures of polyisocyanates B1) and B2). In these mixtures the weight ratio of B1):B2) is preferably 0.2:1 to 5:1. "Mixtures" means mixtures of hydrophobic polyisocyanates B1) with separately manufactured hydrophilically modified polyisocyanates B2). The term "mixture" is not intended to refer to the blends obtained during the hydrophilic modification for the preparation of the polyisocyanates B2), in which only a portion of the polyisocyanates to be modified react to completion with the hydrophilically modifying component (monohydric polyether alcohol) so that generally component B2) itself is a "mixture" of reaction product with unmodified polyisocyanate.

Cross-linking agent component B4) is selected from polyisocyanates B1) to B3) in which the isocyanate groups have been blocked with reversible, mono-functional blocking agents for isocyanate groups. Suitable blocking agents include monohydric alcohols such as methanol, ethanol, n-butanol, cyclohexanol and benzyl alcohol; oximes such as acetone oxime and methylethyl ketoxime; lactams such as ε-caprolactam; active-H compounds such as malonic acid diethyl ester and acetoacetic acid ethyl ester; phenols; and known heterocyclic blocking agents.

Cross-linking agent B5) is selected from water-dilutable or water-dispersible, melamine- or urea-formaldehyde condensation products, such as those described in D. H. Solomon, The Chemistry of Organic Filmformers, p. 235 ff., John Wiley & Sons Inc., New York, 1967. The melamine resins can be wholly or partly replaced by other cross-linking aminoplasts such as those described e.g. in "Methoden der organischen Chemie" ["Methods of organic chemistry"] (Houben-Weyl), vol. 14/2, part 2, 4th Edition, Georg Thieme Verlag, Stuttgart 1963, p. 319 ff.

Cross-linking resin component B6) is selected from mixtures of blocked polyisocyanates B4) with melamine resins B5). These mixtures are preferably used in a weight ratio of B4):B5) of 0.2:1 to 5:1.

Polyisocyanates B1) to B3) having free isocyanate groups are especially preferred for the binder compositions according to the invention. As previously discussed, a hydrophilic modification of the poly-isocyanates is possible but not always required, since the dissolved or dispersed polyester polyurethane resin can function as an emulsifier for the polyisocyanate. Dispersibility can also be provided by the use of external emulsifiers. These comments also apply to hydrophobic cross-linking agents B4) and/or B5).

Cross-linking agents B) are preferably exclusively based on polyisocyanates B1) and/or B2) having free isocyanate groups. In this case and also in the less preferred case of the use of blocked polyisocyanates B4, the relative proportions of the components A) and B) are calculated such that an NCO/OH equivalent ratio, based on the (optionally blocked) isocyanate groups of component B) and the alcoholic hydroxyl groups of component A), is 0.5:1 to 5:1, preferably 0.8:1 to 2:1. The binder compositions are manufactured by simply stirring components A) and B) at room temperature, optionally with the use of suitable mixing or dispersing devices.

During the manufacture of the aqueous binder compositions, the solvents mentioned by way of example are either used in amounts, or following the preparation of aqueous dispersions A) are at least partly removed by distillation, such that the resulting binder compositions contain at most 20 wt. %, preferably at most 10 wt. % of organic solvents.

Before, during or after the manufacture of the aqueous binder compositions prepared by blending of individual components A) and B) and also in the case of the manufacture of the one-component coating compositions (e.g., by using air-drying polyester urethanes), the known additives of lacquer technology may be added. These additives include antifoaming agents, thickeners, levelling aids, pigments, dispersion aids, catalysts, antiskinning agents, antisettling agents, siccatives and emulsifiers.

The coating compositions according to the invention are suitable for all fields of use in which solvent-containing, solvent-free or other types of aqueous paint and coating systems of superior property profile are used. Examples include coating practically all mineral building material surfaces, such as lime- and/or cement-bound plaster, gypsum-containing surfaces, fiber-cement building materials and concrete; coating and sealing of wood and wooden materials such as chipboards, wood-fiber boards and paper; lacquering and coating of metallic surfaces; coating and painting of asphalt- or bitumen-containing road surfaces; and painting and sealing of various plastics surfaces.

The lacquers or coating compositions are may be used for a variety of coatings such as primers, fillers and pigmented or transparent finishes, which can be used in individual or series application, e.g., in the field of industrial lacquering and both original automotive coatings and refinish coatings.

The coating compositions can be applied in particular by a variety of spraying processes, such as compressed air, airless or electrostatic spraying processes, with use of one- or optionally two-component spraying equipment. The lacquers and coating compositions to be manufactured and used according to the invention can also, however, be applied by other methods, for example by brushing, rolling or by doctor blade.

In the following examples, all percentages, unless otherwise indicated, are percentages by weight. In all examples, the work was carried out under inert gas (nitrogen). All data on the hydroxyl and acid numbers relate to mg KOH/g solids.

EXAMPLE 1

Preparation of a polyester polyol a)

Into a 5 liter stirred vessel equipped with stirring, cooling and heating devices were added 328 g of phthalic anhydride, 368 g of isophthalic acid, 1207 g of pentaerythritol, 2484 g of soybean oil fatty acid and 660 g of tert-butylbenzoic acid. The mixture was heated in 6 hours to 210° C. and condensed until the acid number was about 2.5. The resulting polyester polyol 1a) had an OH number of 167.

Preparation of a polyester polyurethane dispersion according to the invention for use in a one-component coating composition 750 g of the above-mentioned polyester precursor 1a), 59 g of dimethylolpropionic acid, 145 g of N-methylpyrrolidone (NMP) and 24.5 g of triethylamine were weighed into a 3 liter reaction vessel equipped with stirring, cooling and heating devices and homogenized at 80° C. Then 160 g of a mixture containing 80% of 1-methyl-2,4-diisocyanatocyclo-hexane and 20% of 1-methyl-2,6-diisocyanato-cyclohexane (referred to hereinafter as "$H_6TDI$") were added all at once while stirring and the charge was heated to 110° C., utilizing the heat of reaction. Stirring was continued until NCO groups were no longer detectable by IR-spectroscopy). To this approximately 87% resin solution, 9 g of ethoxylated nonylphenol (Emulsifier NP 20 from Bayer AG), 5.4 g of cobalt octanoate and 23.5 g of lead octanoate were added, and the mixture was homogenized and cooled to 100° C. The resin solution was subsequently dispersed in 1250 g of water. The mixture temperature was about 60° C. After addition of 13 g of an antiskinning agent (Ascinin K cone from Bayer AG), a 41% aqueous dispersion of a polyester polyurethane having an OH number of 88, an acid number of 32 and a viscosity of 870 mPa.s at 23° C. was obtained.

EXAMPLE 2

787 g of the polyester precursor 1a) from Example 1, 58 g of dimethylolpropionic acid, 149 g of NMP and 24 g of triethylamine were reacted with 155 g of $H_6TDI$ as described in Example 1, then 9.3 g of the external emulsifier described in Example 1, 5.6 g of cobalt octanoate and 24.4 g of lead octanoate were added and the mixture was dispersed in 1050 g of water. After addition of 14 g of the anti-skinning agent described in Example 1, an approximately 45% aqueous dispersion of a polyester polyurethane having an OH number of 84, an acid number of 30 and a viscosity of 710 mPa.s at 23° C. was obtained.

EXAMPLE 3

(Comparison Example)

In a 4 liter reaction vessel 11.20 g of polyester polyol 1 a), 87.5 g of dimethylolpropionic acid, 224 g of NMP and 36.5 g of triethylamine were homogenized and reacted with 292 g of IPDI as described in Example 1. Thereafter 14.4 g of the emulsifier described in Example 1, 8.6 g of cobalt octanoate and 37.8 g of lead octanoate were added and the mixture was homogenized. After addition of 1650 g of water, an approximately 45% aqueous dispersion of a polyester polyurethane having an OH-number, an acid number of 30 and a viscosity of 800 mPa.s at 23° C. was obtained.

Using the dispersions of Examples 1 to 3, air-drying, white pigmented coating compositions were prepared by the addition of titanium dioxide (binder-pigment ratio 100:80). The following properties and test results were obtained:

|  | Example 1 | Example 2 | Comparison Example 3 |
|---|---|---|---|
| Properties of aqueous dispersion | | | |
| Solids content | 41% | 45% | 45% |
| Viscosity (23° C.) | 870 mPa · s | 710 mPa · s | 800 mPa · s |

-continued

|  | Example 1 | Example 2 | Comparison Example 3 |
|---|---|---|---|
| Acid number (100%) | 32 | 30 | 30 |
| Properties of coating composition |  |  |  |
| Viscosity, DIN 4 cup, 23° C. | 67 S | 85 S | 80 S |
| Solids content | 55% | 58% | 59% |
| Coatings properties |  |  |  |
| drying time at RT[1] | 4 h | 8 h | 8 h |
| Pendulum hardness according to DIN 53157 |  |  |  |
| after 16 h, RT | 24 s | 17 s | 20 s |
| after 45 h, RT | 45 s | 30 s | 30 s |
| Water resistance[2] (exposure 24 h): after 16 h, RT | 1–2 | 2 | 3 |
| Viscosity stability of the coating composition (Storage at RT, viscosity, DIN 4 cup, 23° C. |  |  |  |
| initial | 67 s | 85 s | 80 s |
| 10 days | 66 s | 83 s | 74 s |
| 1 month | 67 s | 82 s | 63 s |
| 2 months | 67 s | 83 s | 58 s |
| 3 months | 66 s | 83 s | 49 s |

[1]RT = room temperature
[2]values from 0 to 5; 0 = excellent, 2 = good, 5 = bad The results show that even though the aqueous dispersions, coating compositions and coatings have comparable properties, the coating compositions prepared from the aqueous dispersions of Examples 1) and 2) according to the invention have excellent storage stability as determined by measuring the viscosity as efflux time from a DIN 4 cup at 23° C.) when compared to coating compositions prepared from the aqueous dispersion of Comparison Example 3), which displayed a considerable loss of viscosity.

EXAMPLE 4

Preparation of a polyester polyol a)

Into a 15 liter reaction vessel equipped with stirring, cooling and heating devices and a water separator, were added 1606 g of trimethylol-propane, 6169 g of phthalic anhydride, 1039 g of stearic acid, 3000 g of neopentyl glycol and 1700 g of 1,6-hexanediol. The mixture was heated in 7 hours to 210° C. and condensed until an acid number of <3 was reached. The resulting polyester polyol 4a) had an OH number of 158.

Preparation of a polyester polyurethane dispersion A) according to the invention Into a 6 liter reaction vessel equipped with stirring, cooling and heating devices and a water separator, were added 2105 g of polyester precursor 4a), 100 g of dimethylolpropionic acid, 3.1 g of tinII octoate (Desmorapid SO from Bayer AG) and 375 g of xylene and the mixture was homogenized at 90° C. 294.8 g of H$_6$TDI were then added all at once and the mixture was heated to 130° C., utilizing the heat of reaction. The mixture was stirred until NCO groups were no longer detectable. 61.3 g of dimethylethanolamine were then added and the mixture was dispersed in 3150 g of water. A 42% aqueous dispersion of a polyester polyurethane having an OH number of 89, an acid number of 20 and a viscosity of 330 mPa.s at 23° C. was obtained.

EXAMPLE 5

(Comparison Example)

1614 g of polyester precursor 4a), 80 g of dimethylolpropionic acid, 2.6 g of the tin catalyst described in Example 4 and 300 g of xylene were reacted with 306 g of IPDI as described in Example 4. After the addition of 47 g of dimethylethanolamine, the mixture was dispersed in 2500 g of water. A 42% aqueous dispersion of a polyester polyurethane having an OH number of 86, an acid number of 20 and a viscosity of 280 mPa.s at 23° C. was obtained.

The dispersions obtained according to Example 4 and Comparison Example 5 were tested in aqueous two-component polyurethane coating compositions for metal coating in combination with a polyisocyanate mixture containing equal parts by weight of an HDI trimer hydrophilically modified with a monohydric polyether alcohol and having an NCO content of 17% (Bayhydur VP LS 2032 from Bayer AG) and an unmodified HDI trimer having an NCO content of 22% (Desmodur VP LS 2025 from Bayer AG). The coating composition was pigmented a mixture of iron oxide and zinc phosphate pigments to a pigment volume concentration of 45%). The NCO/OH equivalent ratio was about 1.5:1. The following properties and test results were obtained:

|  | Example 4 | Comparison Example 5 |
|---|---|---|
| Properties of aqueous dispersion: |  |  |
| Solids content | 42% | 42% |
| Viscosity (23° C.) | 330 mPa · s | 280 mPa · s |
| Acid number at 100% solids | 20 | 20 |
| Solids content | 53% | 53% |
| Coating composition properties |  |  |
| Tack-free drying at RT | 25 min. | 25 min. |
| Pendulum hardness after 1 day drying at RT | 105 sec. | 104 sec. |
| Water resistance after 1 day drying at RT (12 hours' exposure) | no adverse affect | no adverse affect |
| Solvent resistance after 1 day drying at RT | good | good |
| Condensed water test after 7 days drying at RT (42 days' exposure as finish) | no adverse affect | no adverse affect |
| Processing time | >6 hours | 3 hours |

The results show even though the coating compositions and resulting coatings had comparable properties, Example 4, according to the invention, had a considerably longer processing time (determined on the basis of the rise in viscosity up to the point where the coating composition was no longer processible, i.e., the composition was cross-linked) than Comparison Example 5. This property is of critical importance for a number of practical applications.

EXAMPLE 6

Preparation of a polyester precursor a)

1119 g of trimethylolpropane, 977 g of neopentyl glycol, 2443 g of hexa-hydrophthalic anhydride and 246 g of 1,6-hexanediol were weighed into a 5 liter reaction vessel equipped with stirring, cooling and heating devices and a water separator, heated in 7 hours to 210° C., and condensed until an acid number of <3 was reached. The resulting polyester precursor 6a) had an OH number of 199.

Preparation of a polyester polyurethane dispersion A)

1133 g of polyester precursor 6a), 41.3 g of a linear aliphatic polyester polycarbonate (Desmophen C 200, OH number 56 from Bayer AG), 31.5 g of trimethylolpropane, 90 g of dimethylolpropionic acid, 1.9 g of the tin catalyst described in Example 4 and 167 g of NMP were weighed into a 4 liter reaction vessel equipped with stirring, cooling and heating devices, and the mixture was heated to 100° C. and homogenized. Then 204 g of H₆TDI were added all at once. The mixture was stirred until NCO groups could no longer be detected. 48.5 g of dimethylethanolamine were then added and the mixture was dispersed in 1900 g of water. A 42% aqueous dispersion of a polyester polyurethane having an OH number of 142, an acid number of 26 and a viscosity of 770 mPa.s at 23° C. was obtained.

EXAMPLE 7

(Comparison Example)

1136 g of polyester precursor 6a), 41.3 g of the polyester polycarbonate described in Example 6, 33 g of trimethylolpropane, 90 g of dimethylolpropionic acid, 1.9 g of the catalyst described in Example 4 and 167 g of NMP were reacted with 200 g of HDI as described in Example 6. 48.5 g of dimethylethanolamine were added to the reaction product and the mixture was dispersed in 1800 g of water. A 43% aqueous dispersion of a polyester polyurethane having an OH number of 142, an acid number of 27 and a viscosity of about 680 mPa.s at 23° C. was obtained.

The dispersions obtained according to Example 6 and Comparison Example 7 were each combined in weight ratio of 75:25 with a melamine resin (Cymel 325 from American Cyanamid) to form a clear stoving coating composition and adjusted by addition of water to an application viscosity of 50 seconds (efflux time, DIN 4 cup, 23° C.).

Coatings, which were cross-linked for 30 minutes at 150° C., showed comparable results in film optics and chemical stability. The coatings according to Example 6 had a somewhat greater hardness than the coatings according to Example 7, while the coatings of Example 7 had somewhat better elasticity. There were considerable differences in the viscosity stability of the coating compositions. The clear coating compositions of Example 6 when stored for 6 months at room temperature showed minor decrease in viscosity from 50 to 44 seconds and was still ready for use. The clear coating composition of Comparison Example 7 showed a considerable decrease in viscosity from 50 to 19 seconds and, thus, was no longer usable without aftertreatment.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous dispersion having a viscosity at 23° C. of 10 to 20,000 mPa.s and a pH of 5.5 to 10 and containing 20 to 60 wt. %, based on solids, of a polyester polyurethane which has a weight average molecular weight of 1500 to 100,000, a hydroxyl number of 20 to 300 mg KOH/g, a carboxyl group content corresponding to an acid number of 7 to 70 mg KOH/g (in which 20 to 100% of the carboxyl groups are present in neutralized form as carboxylate groups), and a content of urethane groups (calculated as —NH—CO—O—, molecular weight 59) of 2.5 to 15 wt. %, and is the reaction of a) 50 to 91 wt. % of a polyester component containing one or more polyester polyols having a hydroxyl number of 25 to 350, b) 7 to 45 wt. % of a polyisocyanate component containing at least 50 wt. %, based on the weight of component b), of 1-methyl-2,4- and/or -2,6-diisocyanatocyclohexane, the remainder selected from organic polyisocyanates having a molecular weight of 140 to 1500, c) 2 to 12 wt. % of a component containing one or more compounds having at least one isocyanate-reactive group and at least one anionic or potential anionic group, d) 0 to 10 wt. % of a component containing one or more compounds having one or two isocyanate-reactive groups and containing at least one non-ionic, hydrophilic polyether chain and e) 0 to 30 wt. % of a component, which is different from components a), c) and d), contains isocyanate-reactive groups and has a molecular weight of 62 to 2500, wherein the sum of the percentages of a) to e) add up to 100.

2. The aqueous dispersion of claim 1 wherein the aqueously dispersed polyester polyurethane has air-drying properties and an iodine number of 20 to 95 and is the reaction product of a) 68 to 88 wt. % of a polyester polyol which is the reaction product of a1) 25 to 65 wt. % of a monocarboxylic acid component containing at least 75 wt. % of one or more fatty acids capable of oxidative drying, a2) 10 to 45 wt. % of a polycarboxylic acid component containing one or more di-, tri- and/or tetracarboxylic acids having a molecular weight of 98 to 840 and/or their corresponding anhydrides and a3) 12 to 40 wt. % of a polyol component containing one or more di- to tetrahydric alcohols having a molecular weight of 62 to 200, b) 8 to 23 wt. % of a polyisocyanate component containing at least 75 wt. %, based on the weight of component b), of 1-methyl-2,4-and/or -2,6-diisocyanatocyclohexane, the remainder selected from organic polyisocyanates having a molecular weight of 168 to 318, c) 4 to 8 wt. % of dimethylolpropionic acid and e) 0 to 10 wt. % of a component, which is different from components a) and c), contains hydroxyl and/or amino groups and has a molecular weight of 62 to 1200, wherein the sum of the percentages of a1) to a3) and a) to e) add up to 100.

3. The aqueous dispersion of claim 1 wherein the aqueously dispersed polyester polyurethane is the reaction product of a) 68 to 88 wt. % of a polyester polyol which is the reaction product of a1) 0 to 24 wt. % of one or more monocarboxylic acids, wherein at least 50%, based on the weight of component a1), are aromatic or saturated (cyclo)aliphatic monocarboxylic acids having 6 to 22 carbon atoms and the remainder are unsaturated aliphatic monocarboxylic acids, a2) 15 to 60 wt. % of one or more di-, tri- and/or tetracarboxylic acids having a molecular weight of 98 to 840 or their anhydrides and a3) 22 to 63 wt. % of one or more di-, tri- and/or tetrafunctional alcohols having a molecular weight of 62 to 200, b) 8 to 23 wt. % of a polyisocyanate component containing at least 75 wt. %, based on the weight of component b), of 1-methyl-2,4-and/or -2,6-diisocyanatocyclohexane, the remainder selected from organic polyisocyanates having a molecular weight of 168 to 318, c) 3 to 9 wt. % of dimethylolpropionic acid and e) 0 to 7.5 wt. % of a component, which is different from components a) and c), contains hydroxyl and/or amino groups and has a molecular weight of 62 to 1200, wherein the sum of the percentages of a1) to a3) and a) to e) add up to 100.

4. A one or two-component coating composition containing as binder the aqueous polyester polyurethane dispersion of claim 1 optionally in combination with a cross-linking agent.

5. A two-component coating composition containing as binder

A) the aqueous polyester polyurethane dispersion of claim 1 and

B) a cross-linking agent selected from the group consisting of

B1) hydrophobic polyisocyanates having a viscosity at 23° C. of 25 to 5000 mPa.s and an NCO content of 5 to 26 wt. %, B2) hydrophilic polyisocyanates containing chemically incorporated non-ionic, hydrophilic polyether chains and having an NCO content of 4 to 24 wt. %, B3) mixtures of polyisocyanates B1) and B2), B4) blocked polyisocyanates corresponding to polyisocyanates B1) to B3) in which the isocyanate groups are blocked with reversible, monofunctional blocking agents for isocyanate groups, B5) amino cross-linking agent resins and B6) mixtures of cross-linking agents B4) and B5), provided that when optionally blocked polyisocyanates are used as the sole cross-linking agents, the equivalent ratio of the optionally blocked isocyanate groups of component B) to the hydroxyl groups of component A) is 0.5:1 to 5:1.

* * * * *